(12) United States Patent
Sudou (10) Patent No.: US 9,857,211 B2
(45) Date of Patent: Jan. 2, 2018

(54) AIR FLOW MEASURING DEVICE

(71) Applicant: DENSO Corporation, Kariya, Aichi-pref. (JP)

(72) Inventor: Akiyuki Sudou, Takahama (JP)

(73) Assignee: DENSO CORPORATION, Kariya (JP)

(*) Notice: Subject to any disclaimer, the term of this patent is extended or adjusted under 35 U.S.C. 154(b) by 133 days.

(21) Appl. No.: 14/509,453

(22) Filed: Oct. 8, 2014

(65) Prior Publication Data
US 2015/0020367 A1    Jan. 22, 2015

Related U.S. Application Data

(62) Division of application No. 13/552,222, filed on Jul. 18, 2012, now abandoned.

(30) Foreign Application Priority Data

Jul. 20, 2011  (JP) .................................. 2011-159323

(51) Int. Cl.
*G01F 1/37* (2006.01)
*G01F 1/684* (2006.01)
(Continued)

(52) U.S. Cl.
CPC ............ *G01F 1/684* (2013.01); *G01F 1/6842* (2013.01); *G01F 15/18* (2013.01);
(Continued)

(58) Field of Classification Search
CPC ........ G01F 1/684; G01F 1/6842; G01F 15/18; G01F 1/37; G01F 1/372; G01F 1/6845;
(Continued)

(56) References Cited

U.S. PATENT DOCUMENTS 4,304,129 A     12/1981  Kawai et al.
4,526,042 A *   7/1985   Yamazoe ................ F02D 41/18
                                                    73/114.32
(Continued)

FOREIGN PATENT DOCUMENTS

DE   102010028388   11/2010
JP   2002-318146    10/2002
JP   2010-261771    11/2010

OTHER PUBLICATIONS

U.S. Appl. No. 13/552,222, filed Jul. 18, 2012; Inventor: Sudou.
(Continued)

*Primary Examiner* — Christopher Besler
*Assistant Examiner* — Bayan Salone
(74) *Attorney, Agent, or Firm* — Nixon & Vanderhye P.C.

(57) ABSTRACT

An air flow measuring device is adapted to be attached to a duct. The device includes a first housing, a second housing, and a flow sensor. The first housing defines a bypass flow passage which takes in a part of air flowing in the duct, and includes a hollow part and a recess. The bypass flow passage is formed in the hollow part. The recess is formed on an upper side of the hollow part in a vertical direction of the device, and at the recess, an outer surface of the first housing is recessed inward of the first housing. The second housing is formed through secondary formation with the first housing as a primary formed part. The first housing is held on a lower side of the second housing in the vertical direction. The flow sensor is disposed in the bypass flow passage.

2 Claims, 7 Drawing Sheets

(51) Int. Cl.
*G01F 1/699* (2006.01)
*G01F 15/18* (2006.01)
*F02D 41/18* (2006.01)
*G01F 15/02* (2006.01)
*B29C 45/14* (2006.01)

(52) U.S. Cl.
CPC ...... *B29C 45/14065* (2013.01); *F02D 41/187* (2013.01); *G01F 1/37* (2013.01); *G01F 1/372* (2013.01); *G01F 1/6845* (2013.01); *G01F 1/699* (2013.01); *G01F 15/02* (2013.01); *Y10T 29/49826* (2015.01); *Y10T 29/49895* (2015.01)

(58) Field of Classification Search
CPC .... G01F 1/699; G01F 15/02; Y10T 29/49826; Y10T 29/49895; B29C 45/14065
USPC ............ 73/861, 202.5, 204.22; 29/428, 464; 264/275
See application file for complete search history.

(56) References Cited

U.S. PATENT DOCUMENTS

| | | | |
|---|---|---|---|
| 5,355,726 A | 10/1994 | Zurek et al. | |
| 5,631,415 A * | 5/1997 | Igarashi | G01F 1/6842 73/114.34 |
| 5,892,146 A * | 4/1999 | Kobayashi | G01F 5/00 73/114.34 |
| 6,189,379 B1 | 2/2001 | Igarashi et al. | |
| 6,516,785 B1 | 2/2003 | Nakada et al. | |
| 6,591,675 B1 | 7/2003 | Doderer et al. | |
| 7,062,964 B2 * | 6/2006 | Saito | G01F 1/6842 73/204.22 |
| 7,159,457 B2 * | 1/2007 | Wildgen | G01F 1/6842 73/202.5 |
| 7,270,000 B2 * | 9/2007 | Nakada | G01F 1/6842 73/204.26 |
| 7,313,954 B2 * | 1/2008 | Kouno | G01F 5/00 73/202 |
| 7,467,546 B2 * | 12/2008 | Igarashi | G01F 1/6842 73/202.5 |
| 7,891,240 B2 * | 2/2011 | Morino | G01F 1/6842 73/202.5 |
| 7,942,052 B2 * | 5/2011 | Ariyoshi | G01F 1/72 73/202.5 |
| 7,942,053 B2 * | 5/2011 | Saito | G01F 1/6845 73/204.21 |
| 8,549,914 B2 * | 10/2013 | Saito | G01F 1/68 73/431 |
| 8,916,074 B2 * | 12/2014 | Takiguchi | G01F 1/6842 264/251 |
| 8,992,379 B2 * | 3/2015 | Isaacs | B60K 6/12 475/203 |
| 2001/0027683 A1 | 10/2001 | Igarashi et al. | |
| 2001/0037678 A1 | 11/2001 | Kamiya | |
| 2002/0056319 A1 | 5/2002 | Kobayashi et al. | |
| 2004/0055375 A1 | 3/2004 | Zurek et al. | |
| 2004/0060354 A1 | 4/2004 | Watanabe et al. | |
| 2004/0069060 A1 * | 4/2004 | Bogdanov | G01F 1/6842 73/204.22 |
| 2004/0093956 A1 | 5/2004 | Straight et al. | |
| 2006/0059986 A1 | 3/2006 | Wildgen | |
| 2006/0065049 A1 | 3/2006 | Nakada et al. | |
| 2006/0156808 A1 | 7/2006 | Igarashi et al. | |
| 2006/0266110 A1 | 11/2006 | Kouno et al. | |
| 2007/0062275 A1 | 3/2007 | Beyrich et al. | |
| 2008/0250855 A1 | 10/2008 | Nakada et al. | |
| 2009/0126477 A1 | 5/2009 | Saito et al. | |
| 2010/0000308 A1 | 1/2010 | Ariyoshi et al. | |
| 2010/0170483 A1 | 7/2010 | Wienand et al. | |
| 2010/0242589 A1 * | 9/2010 | Morino | G01F 1/6842 73/202.5 |
| 2012/0048015 A1 | 3/2012 | Saito et al. | |
| 2012/0129648 A1 | 5/2012 | Isaacs et al. | |
| 2012/0325011 A1 * | 12/2012 | Takiguchi | G01F 1/6842 73/861 |

OTHER PUBLICATIONS

Office Action dated Feb. 13, 2014 in U.S. Appl. No. 13/552,222.
Office Action dated Jul. 8, 2014 in U.S. Appl. No. 13/552,222.
Office Action (2 pages) dated May 28, 2013, issued in corresponding Japanese Application No. 2011-159323 and English translation (3 pages).
Office Action (1 page) dated Sep. 3, 2013, issued in corresponding Japanese Application No. 2011-159323 and English translation (2 pages).
English Translation of DE 10201028388 A1; Enomoto, Nov. 4, 2010.

* cited by examiner

AIR FLOW MEASURING DEVICE

CROSS REFERENCE TO RELATED APPLICATION

This application is a divisional application claiming priority from U.S. application Ser. No. 13/552,222, filed Jul. 18, 2012, which is based on Japanese Patent Application No. 2011-159323 filed on Jul. 20, 2011, the disclosure of which is incorporated herein by reference.

TECHNICAL FIELD

The present disclosure relates to an air flow measuring device that includes a first housing for forming a bypass flow passage which takes in a part of air flowing inside a duct, and a second housing formed through secondary formation with the first housing as a primary formed part and that measures an air flow rate by a flow sensor disposed in the bypass flow passage.

BACKGROUND

Figure 7:
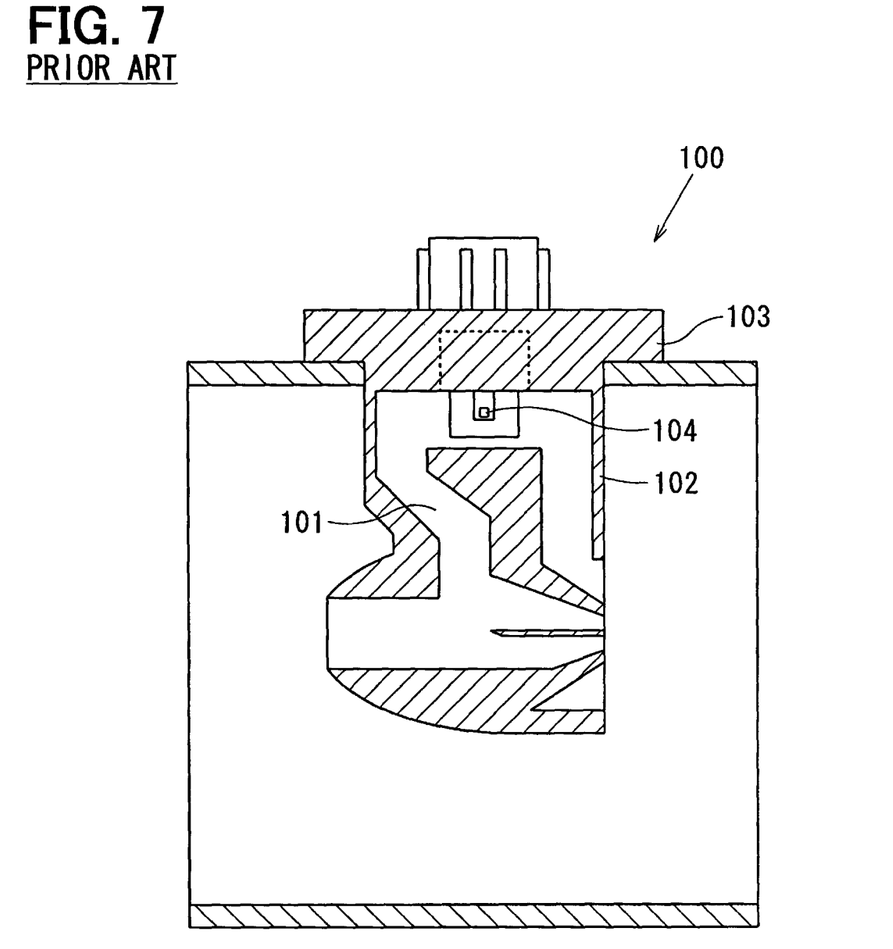
FIG. 7 is a sectional view illustrating a previously proposed air flow measuring device.

Conventionally, as illustrated in FIG. 7, a device including a first housing 102 for defining a bypass flow passage 101 that takes in a part of air which flows inside a duct, a second housing 103 for attaching the first housing 102 to the duct, and the flow sensor 104 that measures a flow rate of air which flows through the bypass flow passage 101, is known for an air flow measuring device 100 (see JP-A-2010-261771).

When the first housing 102 is obtained as a primarily shaped product, and the second housing 103 is secondarily formed, and then the first housing 102 and the second housing 103 are integrated, because the first housing 102 includes a hollow part which constitutes the bypass flow passage 101, there is concern that the first housing 102 may be deformed or damaged due to the pressure of secondary formation resin injected at the time of the secondary formation. If the first housing 102 is deformed, the shape of the bypass flow passage 101 changes. Accordingly, the passage 101 does not have the shape of the bypass flow passage 101 as designed, so that desired output characteristics of the flow sensor 104 cannot be obtained.

SUMMARY

According to the present disclosure, there is provided an air flow measuring device adapted to be attached to a duct. The device includes a first housing, a second housing, and a flow sensor. The first housing defines a bypass flow passage which takes in a part of air flowing in the duct, and includes a hollow part and a recess. The bypass flow passage is formed in the hollow part. The recess is formed on an upper side of the hollow part in a vertical direction of the device, and at the recess, an outer surface of the first housing is recessed inward of the first housing. The second housing is formed through secondary formation with the first housing as a primary formed part. The first housing is held on a lower side of the second housing in the vertical direction. The flow sensor is disposed in the bypass flow passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An air flow measuring device of an embodiment is adapted to be attached to a duct. The device includes a first housing, a second housing, and a flow sensor. The first housing defines a bypass flow passage which takes in a part of air flowing in the duct, and includes a hollow part and a recess. The bypass flow passage is formed in the hollow part. The recess is formed on an upper side of the hollow part in a vertical direction of the device, and at the recess, an outer surface of the first housing is recessed inward of the first housing. The second housing is formed through secondary formation with the first housing as a primary formed part. The first housing is held on a lower side of the second housing in the vertical direction. The flow sensor is disposed in the bypass flow passage.

A configuration of a flow measuring device 1 in accordance with the embodiment will be described with reference to FIGS. 1A to 2B. The flow measuring device 1 is, for example, an air flow meter for measuring the amount of air suctioned into an engine for an automobile, and used through its attachment to a duct D which defines an intake passage toward the engine for the automobile. The flow measuring device 1 is constituted integrally of a housing 2, a flow sensor 3, a circuit chip 4 and so forth, which will be described in greater detail hereinafter.

The housing 2 is formed from resin, and includes a first housing 2A for defining a bypass flow passage which takes in a part of air flowing inside the duct D, and a second housing 2B that is formed through secondary formation with the first housing 2A as a primary formed part.

At the time of the placement of the first housing 2A to the duct D, the housing 2A is held on a lower side of the second housing 2B when a direction perpendicular to a mainstream direction (i.e., duct radial direction) is referred to as an upper-lower direction. The second housing 2B is disposed outside the duct D, and the first housing 2A is disposed inside the duct D.

The first housing 2A includes a hollow part 7, in which the bypass flow passage is formed, and an intermediate part 8 provided between the hollow part 7 and the second housing 2B. The second housing 2B includes a connecting portion 9 connected with the duct D, and a connector part 11 that holds a terminal 10 for electrically connecting together a circuit chip 4 and an external device. In addition, a through hole, through which a bolt for attachment of the connecting portion 9 to the duct D passes, is provided for the connecting portion 9.

The hollow part 7 includes an air-taking port 13 that opens toward an upstream side of a flow (i.e., mainstream) of air through the intake passage and takes in a part of intake air, an internal flow passage 14 through which the air taken from the air-taking port 13 passes, and a discharge port 15 that opens toward a downstream side of the intake passage, for returning the air taken in from the air-taking port 13 into the intake passage.

The internal flow passage 14 includes the air-taking port 13 that opens toward the upstream side of the flow (i.e., mainstream) of air through the intake passage and takes in a part of air flowing through the intake passage in its forward direction, the internal flow passage 14 through which the air taken in from the air-taking port 13 passes and which accommodates a flow sensor 3, and the discharge port 15 that opens toward the downstream side of the intake passage and returns the air taken in from the air-taking port 13 and then passing through the flow sensor 3, into the intake passage. The flow sensor 3 generates a heat transfer phenomenon between the sensor 3 and the air taken in from the air-taking port 13, and produces an output value equivalent to a mass flow rate of air.

The internal flow passage 14 includes an air-taking passage 17 that is formed continuously from the air-taking port 13 to the downstream side, a discharge passage 18 that is formed continuously from the discharge port 15 to the upstream side, and a circulation passage 19 that accommodates the flow sensor 3 and is formed around to connect together the air-taking passage 17 and the discharge passage 18.

The air-taking passage 17 is formed to extend linearly from the air-taking port 13 to the downstream side, and the flow in the air-taking passage 17 is parallel to the forward flow in the mainstream. A dust discharge passage 21 for making dust contained in the air taken in from the air-taking port 13 flow straight and for discharging the dust, is connected to a downstream end of the air-taking passage 17. A dust discharge port 22 is formed at a downstream end of the dust discharge passage 21.

The circulation passage 19 is connected to the air-taking passage 17 and the discharge passage 18 generally in a C-shaped manner, for example. The air taken in from the air-taking port 13 flows around from the air-taking passage 17 toward the discharge passage 18 along the passage 19. The flow sensor 3 is accommodated in a part of the circulation passage 19 at which air flows in a direction opposite from the flow direction in the air-taking passage 17. A flow rate of air is detected by the flow sensor 3 disposed in the circulation passage 19.

The discharge passage 18 is connected to a downstream end of the circulation passage 19, and is bent to circle around generally at a right angle from the downstream end of the circulation passage 19. The discharge port 15 is formed at a downstream end of the passage 18 (see FIGS. 1A and 2A). The discharge passage 18 branches into two parts from the upstream end so as to straddle the air-taking passage 17, and the discharge port 15 is formed at two positions on both sides of the air-taking passage 17 (see FIG. 1B).

Figure 1A:
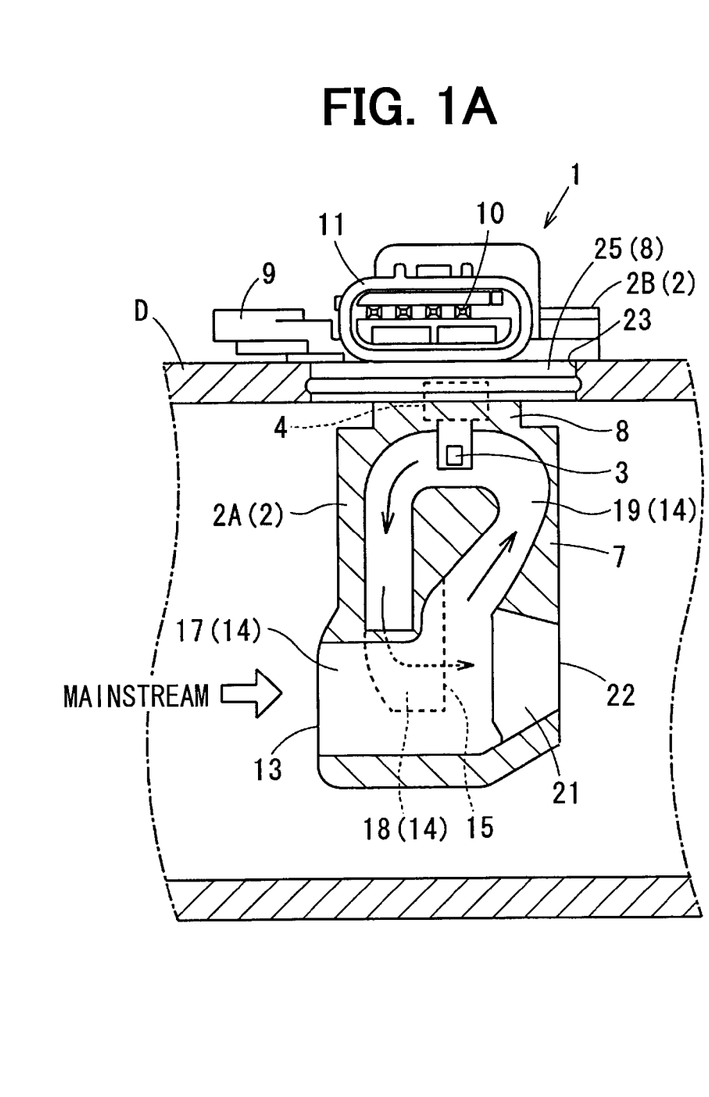
FIG. 1A is a sectional view illustrating an air flow measuring device in accordance with an embodiment.
Figure 1B:
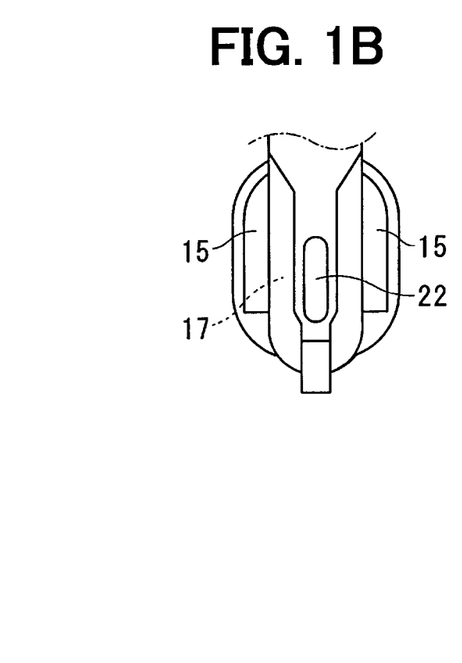
FIG. 1B is a diagram illustrating the air flow measuring device when a discharge port is viewed from a downstream side of a mainstream according to the embodiment.
Figure 2A:
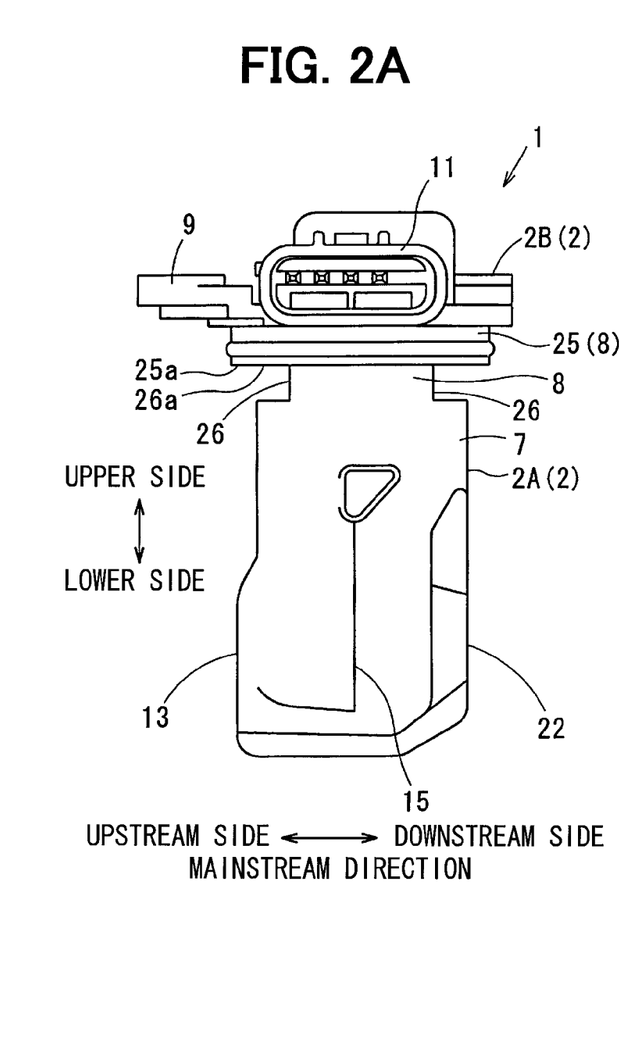
FIG. 2A is a side view illustrating the air flow measuring device of the embodiment.
Figure 2B:
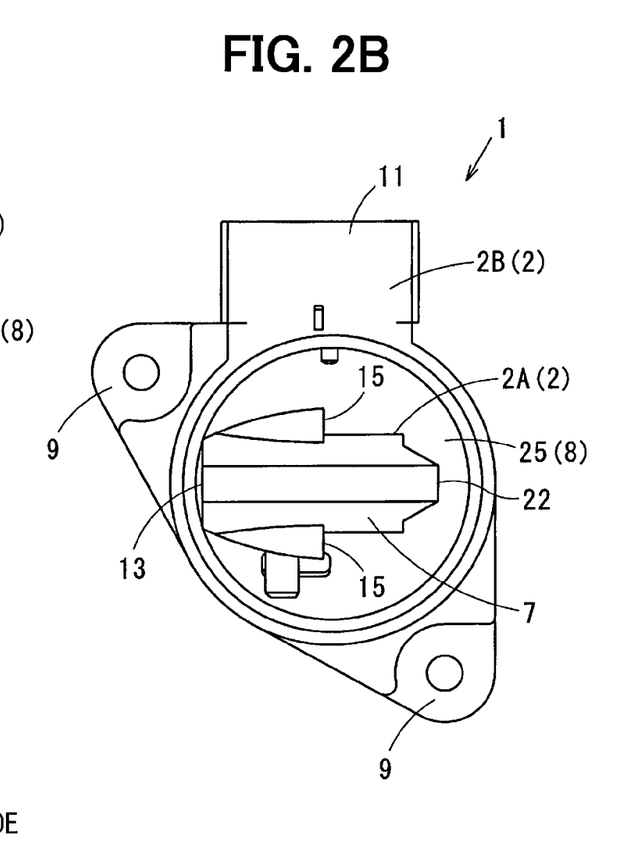
FIG. 2B is a diagram illustrating the air flow measuring device when viewed from its lower side according to the embodiment.

The intermediate part 8 is provided between the hollow part 7 and the second housing 2B. The intermediate part 8 includes a fitted part 25 that is fitted into an attachment hole 23 which is formed through the duct D. The fitted part 25 is formed in the shape of a circular disk, and an outer peripheral surface of the fitted part 25 is in contact with an inner peripheral surface of the attachment hole 23. The second housing 2B is formed on an upper side of the intermediate part 8 through the secondary formation.

The flow sensor 3 outputs an electrical signal (e.g., voltage signal) in accordance with a flow rate of air which flows through the bypass flow passage. Specifically, the sensor 3 includes a heater element and a temperature-sensitive element made of thin film resistors on a membrane, which is disposed on a semiconductor substrate. These elements are connected to a circuit board (not shown) incorporated into the circuit chip 4.

The circuit chip 4 includes a heating element control circuit for controlling the heater element to be a set temperature, an output circuit for outputting a voltage in accordance with the flow rate, and an amplifying circuit for amplifying the output voltage from this output circuit. The circuit chip 4 is accommodated in an accommodation space formed inside the first housing 2A.

Characteristics of the flow measuring device 1 of the embodiment will be described. In the present embodiment, as illustrated in FIG. 2A, the first housing 2A includes a recess 26, at which an outer surface of the first housing 2A is depressed inward of the first housing 2A, on an upper side of the hollow part 7. The recess 26 is provided at the intermediate part 8. More specifically, the recess 26 is formed on the outer surface of the first housing 2A between the fitted part 25 and the hollow part 7.

The recess 26 is formed at two positions on the upstream and downstream sides in the mainstream direction. The upstream recess 26 is recessed toward the downstream side, and the downstream recess 26 is recessed toward the upstream side. A part of a lower surface 25a of the fitted part 25 serves as an upper (i.e., second housing 2B-side) side surface that defines the recess 26 (hereinafter referred to as an upper side surface 26a).

Figure 3:
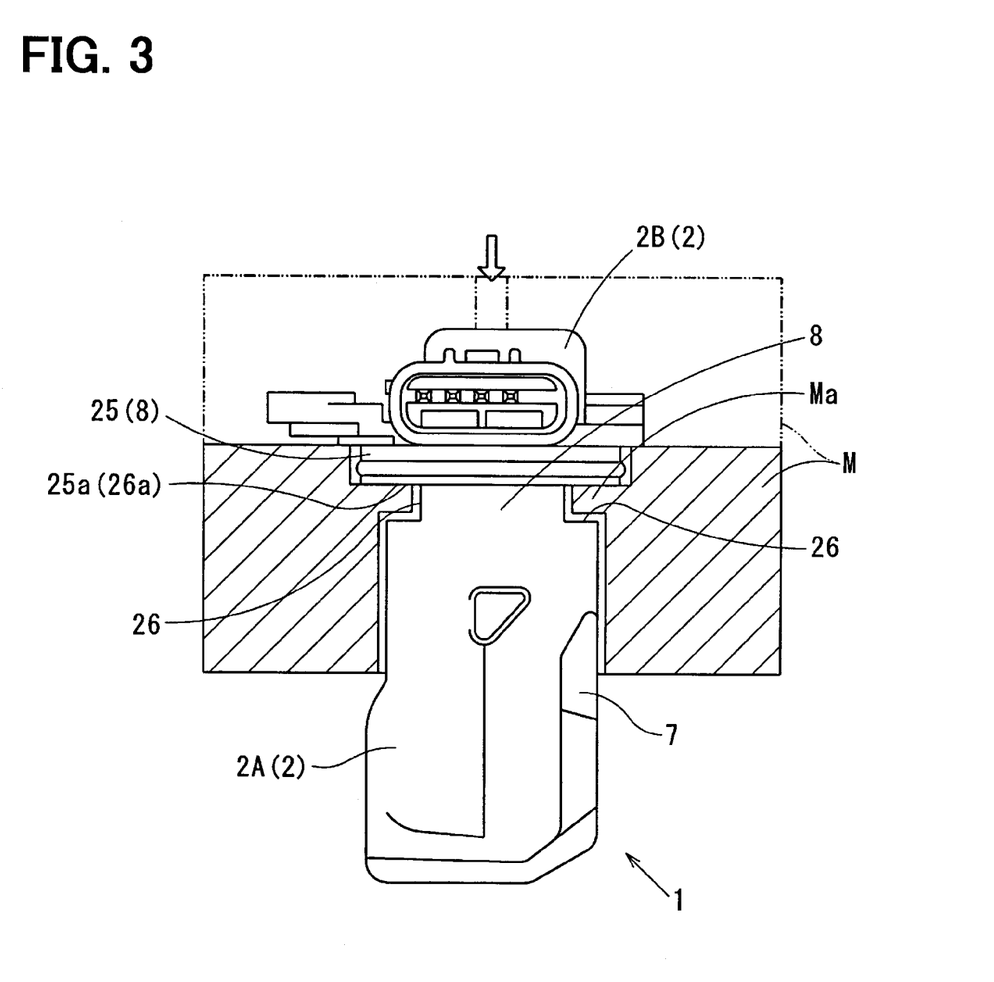
FIG. 3 is a diagram illustrating a state of the air flow measuring device at time of secondary formation according to the embodiment.

A formation process of the second housing 2B will be described in reference to FIG. 3. The second housing 2B is formed as a result of the injection of secondary formation resin into a die M with the first housing 2A, which is a primarily shaped product, being fixed in the die M. In FIG. 3, a portion of the die M (for forming the second housing 2B) that fixes the first housing 2A is indicated in cross-section. The die M has a projection portion Ma inserted in the recess 26. The projection portion Ma is inserted into the recess 26 from the outer circumference of the first housing 2A.

The die M is disposed with the projection portion Ma in contact with the lower surface 25a of the fitted part 25 including the upper side surface 26a of the recess 26. For this reason, the lower surface 25a of the fitted part 25 in contact with the projection portion Ma serves as a die cramp surface which supports the first housing 2A at the time of the secondary formation. In addition, a minute clearance exists between the outer surface of the first housing 2A and the die M other than the die cramp surface.

Operation and effects of the flow measuring device 1 of the embodiment will be described. In the flow measuring device 1 of the embodiment, the recess 26, at which the outer surface of the first housing 2A is depressed inward of the first housing 2A, is formed on the upper side of the hollow part 7. Because the first housing 2A has the above-described shapes, a part of the die M for holding the first housing 2A can be inserted into the recess 26 at the time of the secondary formation. In this case, the upper side surface 26a that defines the recess 26 can be in contact with the die M, and the die cramp surface of the first housing 2A that is supported by the die M at the time of the secondary formation can be increased.

Figure 6:
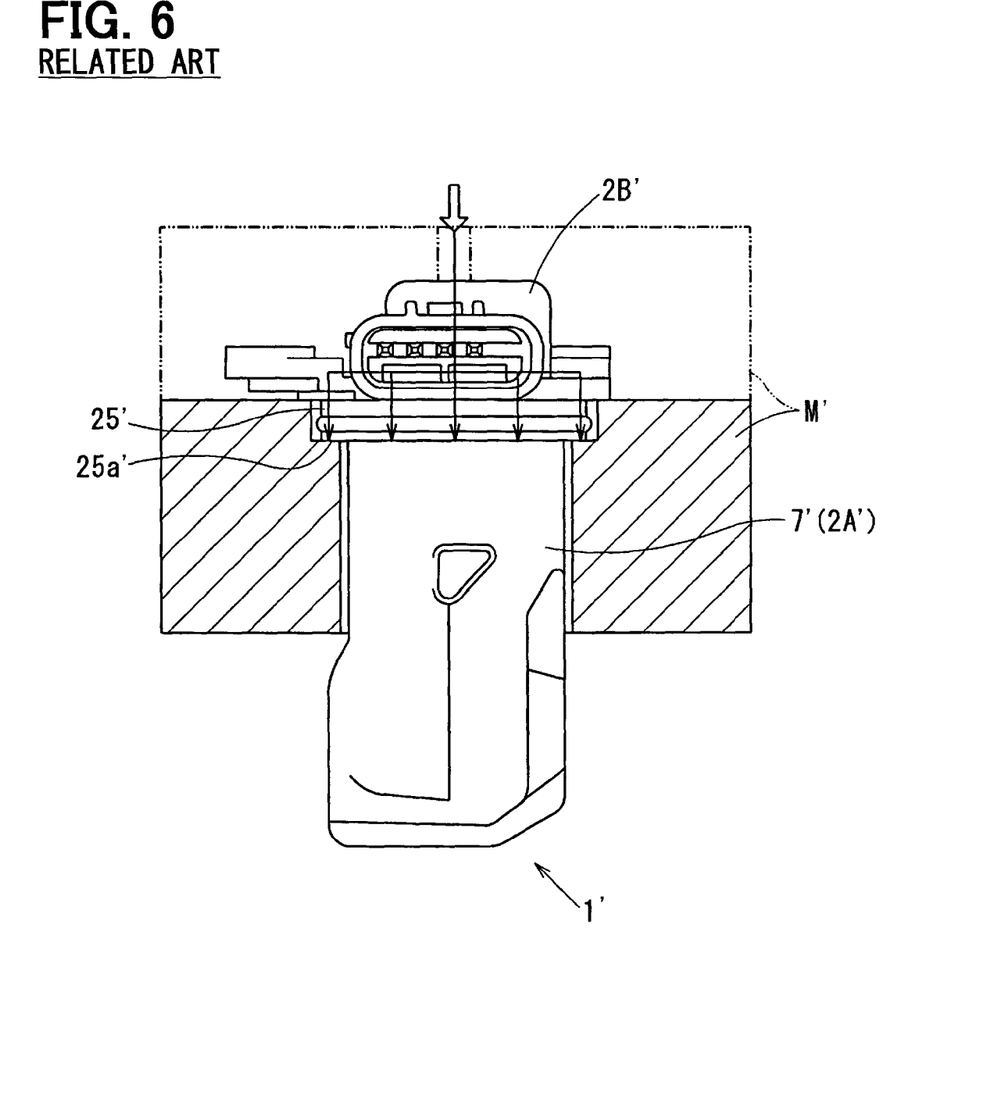
FIG. 6 is a diagram illustrating a state of an air flow measuring device at time of secondary formation in accordance with a comparative example.

A flow measuring device 1' that does not have the recess 26 is illustrated in FIG. 6 as a comparative example. In the case of a first housing 2A' not having the recess 26, a lower surface 25a' (die cramp surface) of a fitted part 25' that can be in contact with a die M' cannot be secured widely compared to the embodiment. The pressure caused by the injection of secondary formation resin is applied to the entire first housing 2A' from the upper side, as illustrated by arrows with continuous lines in FIG. 6. Meanwhile, if the die cramp surface is small, the first housing 2A' may be deformed by the pressure due to the injection of secondary formation resin. Particularly, a hollow part 7' is easily deformed, and if the hollow part 7' is deformed, there may be a problem that the shape of a bypass flow passage as designed cannot be maintained.

In comparison, in the present embodiment, since a die cramp area that is in contact with the die M can be increased, the die M can be received by the die cramp surface on a larger area at the time of the secondary formation. The pressure resistance of the first housing 2A improves, and influence of the pressure does not easily reach the hollow part 7, so that the deformation of the hollow part 7 can be prevented. Accordingly, the shape of a bypass flow passage as designed can be maintained, and desired output characteristics of the flow sensor 3 can be achieved. In addition, the die cramp area can be set by means of the number of the recesses 26 or depth of the recess 26.

Figure 4:
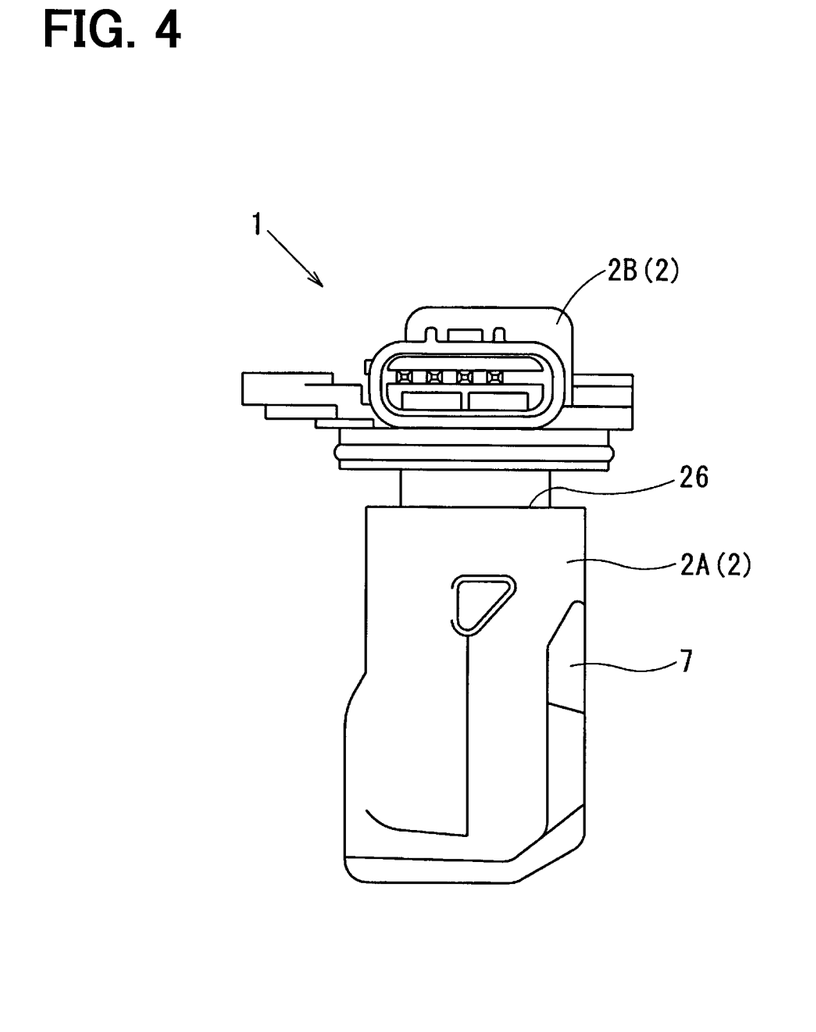
FIG. 4 is a side view illustrating an air flow measuring device in accordance with a modification.

Modifications of the above embodiment will be described. In the embodiment, the recess 26 is provided at two positions on the upstream and downstream sides in the mainstream direction. Alternatively, the recess 26 may be provided only on either one of the upstream and downstream sides. Moreover, the recess 26 may be provided as a circumferential groove that is formed continuously along the whole circumference of an outer peripheral surface of the first housing 2A (see FIG. 4). Accordingly, the die cramp area can be increased along the entire outer circumference of the first housing 2A.

In the embodiment, the bypass flow passage is configured using the internal flow passage 14 which has the circulation passage 19. However, the mode of the bypass flow passage is not limited to the above. A mode of a bypass flow passage, which is formed from the air-taking port 13 along the forward flow in the mainstream direction without making the taken-in part of the mainstream flow around and through which the intake air entering from the air-taking port 13 flows along the forward flow in the mainstream direction so as to be discharged, may also be employed.

Figure 5A:
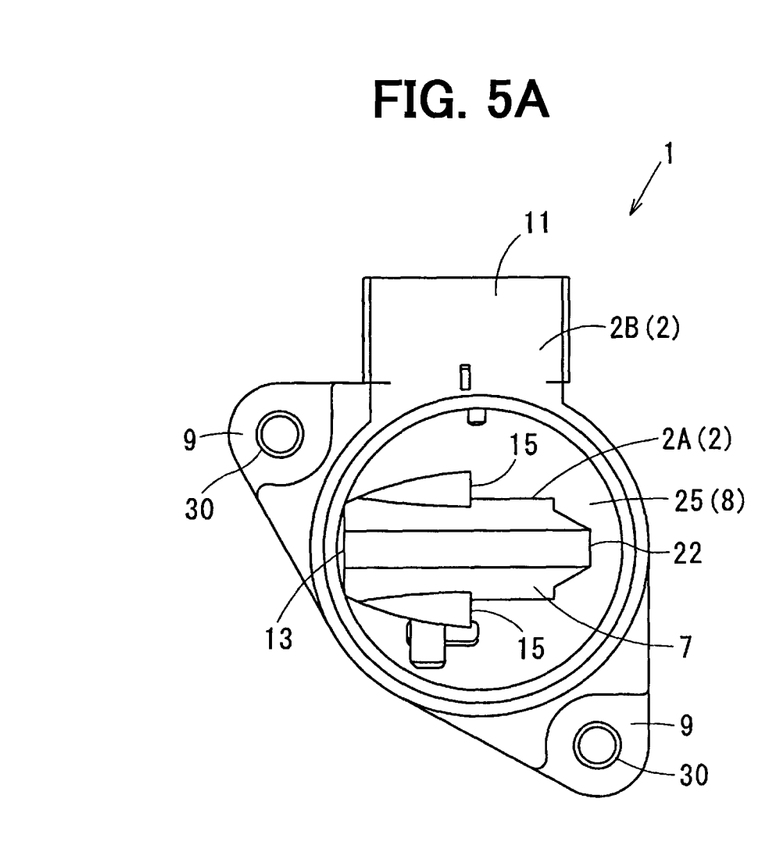
FIG. 5A is a diagram illustrating an air flow measuring device when viewed from its lower side in accordance with a modification.
Figure 5B:
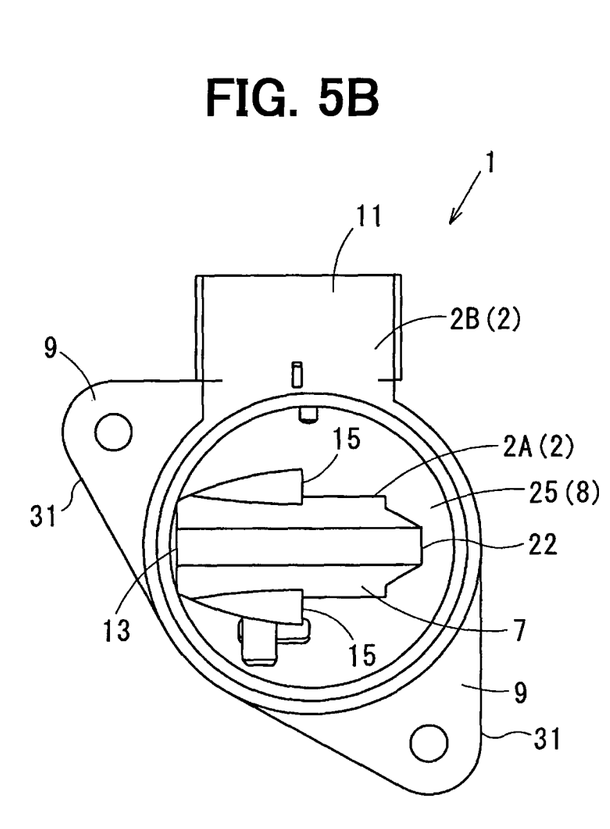
FIG. 5B is a diagram illustrating an air flow measuring device when viewed from its lower side in accordance with a modification.

As illustrated in FIG. 5A, a metal bush 30 through which the bolt for attachment of the connecting portion 9 to the duct D passes may be insert-molded at the connecting portion 9 of the second housing 2B. In addition, as illustrated in FIG. 5B, a metal plate 31 including the through hole, through which the bolt for attachment of the connecting portion 9 passes, may be insert-molded into the second housing 2B to be used as the connecting portion 9.

To sum up, the air flow measuring device 1 of the above embodiment can be described as follows.

An air flow measuring device 1 is adapted to be attached to a duct D. The device 1 includes a first housing 2A, a second housing 2B, and a flow sensor 3. The first housing 2A defines a bypass flow passage 14 which takes in a part of air flowing in the duct D, and includes a hollow part 7 and a recess 26. The bypass flow passage 14 is formed in the hollow part 7. The recess 26 is formed on an upper side of the hollow part 7 in a vertical direction of the device 1, and at the recess 26, an outer surface of the first housing 2A is recessed inward of the first housing 2A. The second housing 2B is formed through secondary formation with the first housing 2A as a primary formed part. The first housing 2A is held on a lower side of the second housing 2B in the vertical direction. The flow sensor 3 is disposed in the bypass flow passage 14. Accordingly, the recess 26, at which the outer surface of the first housing 2A is depressed inward of the first housing 2A, is formed between the hollow part 7 and the second housing 2B in the upper-lower direction.

Because the first housing 2A has the above-described shapes, a part of the die M for holding the first housing 2A can be inserted into the recess 26 at the time of the secondary formation. In this case, the side surface 26a, out of the side surfaces that define the recess 26, the surface 26a being located on the second housing 2B-side, can be in contact with the die M. The die cramp surface 25a of the first housing 2A that is supported by the die M at the time of the secondary formation can be increased. In addition, the die cramp area can be set by the number of the recesses 26 or depth of the recess 26. When the die cramp area increases, the die M can be received by the die cramp surface on a larger area at the time of the secondary formation. As a result, the pressure resistance of the first housing 2A improves, and influence of the pressure does not easily reach the hollow part 7, so that the deformation of the hollow part 7 can be prevented.

The recess 26 may be configured as a circumferential groove that is formed continuously along an entire periphery of the outer surface of the first housing 2A. Accordingly, the die cramp area can be increased along the entire outer circumference of the first housing 2A.

The recess 26 includes side surfaces on its both sides in the vertical direction. A die M is used in a process of the secondary formation. One (26a) of the side surfaces of the recess 26 located on the second housing 2B-side may serve as a die cramp surface as a result of insertion of a part of the die M into the recess 26 at time of the formation of the second housing 2B.

Additional advantages and modifications will readily occur to those skilled in the art. The invention in its broader terms is therefore not limited to the specific details, representative apparatus, and illustrative examples shown and described.

What is claimed is:

1. A method of producing an air flow measuring device, the air flow measuring device including:
   a first housing that defines a bypass flow passage which takes in a part of air flowing in a duct and that includes:
      a hollow part in which the bypass flow passage is formed; and a recess which is formed on an upper side of the hollow part in a vertical direction of the device and at which an outer surface of the first housing is recessed inward of the first housing;
   a second housing that is formed through secondary formation with the first housing as a primary formed part, wherein:
   the recess includes side surfaces on its both sides in the vertical direction; and one of the side surfaces of the recess is located on a side of the recess that faces the second housing; and
a flow sensor that is disposed in the bypass flow passage,
the method comprising:
provi ding the first housing; and
forming the second housing through the secondary formation with the first housing as the primary formed part such that the first housing is held on a lower side of the second housing in the vertical direction,
wherein the forming of the second housing includes inserting a part of a die into the recess to make the one of the side surfaces serve as a die cramp surface, and
wherein, during the step of forming the second housing through the secondary forming:
the first housing is supported by a part of the die on the lower side of the second housing in the vertical direction;
the second housing is formed as a result of injection of secondary formation resin into the die with the first housing being fixed in the die; and
the first housing, which is provided separately from the duct, is attached to the duct.

2. The method according to claim 1, further comprising configuring the recess as a circumferential groove that is formed continuously along an entire periphery of the outer surface of the first housing.

* * * * *